(12) United States Patent
Gibbs et al.

(10) Patent No.: US 11,967,851 B2
(45) Date of Patent: Apr. 23, 2024

(54) ELECTRIFIED POWERTRAIN WITH METHOD FOR DETERMINING BATTERY LIMITS BASED ON CELL FACTORS

(71) Applicant: GM GLOBAL TECHNOLOGY OPERATIONS LLC, Detroit, MI (US)

(72) Inventors: James C. Gibbs, Brighton, MI (US); Andrew M. Zettel, Port Moody (CA); Calvin Goodman, Auburn Hills, MI (US); Rajesh Nagappala, Lake Orion, MI (US)

(73) Assignee: GM Global Technology Operations LLC, Detroit, MI (US)

(*) Notice: Subject to any disclaimer, the term of this patent is extended or adjusted under 35 U.S.C. 154(b) by 378 days.

(21) Appl. No.: 17/184,968

(22) Filed: Feb. 25, 2021

(65) Prior Publication Data
US 2022/0271552 A1 Aug. 25, 2022

(51) Int. Cl.
*H01M 50/55* (2021.01)
*B60L 50/51* (2019.01)
*B60L 50/60* (2019.01)
*B60L 58/12* (2019.01)
*H01M 10/48* (2006.01)
*H02J 7/00* (2006.01)

(52) U.S. Cl.
CPC .......... *H02J 7/00712* (2020.01); *B60L 50/51* (2019.02); *B60L 50/66* (2019.02); *B60L 58/12* (2019.02); *H02J 7/0013* (2013.01); *H02J 7/0029* (2013.01); *H02J 7/0048* (2020.01); *H02J 7/005* (2020.01); *H02J 7/007194* (2020.01); *B60L 2210/40* (2013.01); *B60L 2240/545* (2013.01); *B60L 2240/547* (2013.01); *B60L 2240/549* (2013.01)

(58) Field of Classification Search
CPC ....................................................... H02P 27/06
See application file for complete search history.

(56) References Cited

U.S. PATENT DOCUMENTS

| | | | |
|---|---|---|---|
| 6,611,128 B2* | 8/2003 | Minamiura | B60L 3/0023 320/134 |
| 8,749,204 B2* | 6/2014 | Majima | H01M 10/48 324/426 |
| 9,490,646 B2* | 11/2016 | Kubota | G01R 31/3835 |
| 2017/0203654 A1* | 7/2017 | He | B60L 7/10 |
| 2022/0289065 A1* | 9/2022 | Matsuda | G06Q 10/06315 |

* cited by examiner

*Primary Examiner* — Kawing Chan
*Assistant Examiner* — Charles S Laughlin
(74) *Attorney, Agent, or Firm* — Quinn IP Law

(57) ABSTRACT

A method for adapting a usage level of a battery pack includes measuring cell sense data for each respective battery cell using a cell sense circuit, the cell sense data including a cell voltage, current, and temperature. The method includes processing the cell sense data, for each respective battery cell, through multiple battery state functions of a controller to generate numeric cell degradation values (CDVs). The battery state functions are calibrated relationships of the cell sense data to predetermined battery fault conditions. Thereafter, the method includes automatically adapting the usage level of the battery pack during operation of the battery pack, via the controller, based on the numeric CDVs. An electric powertrain system includes the battery pack, cell sense circuit, a rotary electric machine, and a controller configured to execute the above method.

20 Claims, 4 Drawing Sheets

ELECTRIFIED POWERTRAIN WITH METHOD FOR DETERMINING BATTERY LIMITS BASED ON CELL FACTORS

INTRODUCTION

Rotary electric machines are used to generate or receive torque during different operating modes in a host of mobile and stationary electromechanical systems. For instance, electrified powertrains of battery electric vehicles and hybrid electric vehicles include at least one electric propulsion motor, an output shaft of which is coupled to a drive axle. Several electric propulsion motors could be used in other configurations to individually power different drive axles and/or road wheels. During regeneration modes, the electric machines may be operated as electric generators to capture and convert kinetic energy into a charging current, e.g., to recharge a high-voltage propulsion battery pack. In addition to being capable of being charged in this manner, the propulsion battery pack in some configurations can also be charged by an offboard charger, using an onboard solar panel/solar cells, or other possible charging techniques.

In order to energize an electric propulsion motor in a typical automotive application, the above-noted battery pack may be used as an onboard direct current (DC) power supply connected to a DC voltage bus. When the electric propulsion motor is a single-phase or polyphase/alternating current (AC) device, a DC side of the power inverter module is connected to the DC voltage bus, with an AC side of the power inverter module connected to the electric propulsion motor. High-speed switching control of the power inverter module generates an AC output voltage suitable for energizing the phase windings. During regenerating modes, an AC input voltage feeds into the power inverter module, with the internal switching operations of providing a DC output voltage to the battery pack.

A typical propulsion battery pack is constructed from an application-suitable number of electrochemical battery cells, within which charged electrode foils are immersed in an electrolyte material. Exposed cell tabs of the constituent battery cells are conductively joined in a series or parallel arrangement in different configurations to provide a desired DC output voltage. At some point in the operating life of the battery pack, however, a given battery cell may exhibit an intermittent or sustained internal electrical short condition or other fault. Such fault conditions may not be readily distinguishable from the electrical behavior of aging cells that are otherwise healthy, and thus reactive control strategies may be less than optimal in terms of drive performance and operating longevity.

SUMMARY

Disclosed herein are systems, associated control logic, and methods for controlling charging or discharging operation of a high-voltage propulsion battery pack aboard a motor vehicle or other mobile platform having an electrified powertrain. As understood in the art, detection of an electrical short or other fault condition in a high-voltage propulsion battery pack, even one of a transient nature, often results in inhibition of a charging or discharging mode as a reactive control action. A motor vehicle could be rendered inoperable, or effectively so, until the fault is repaired. However, older vehicles may not be worth repairing, which can greatly reduce residual value. Thus, the present strategy enables an operator to potentially extend the useful operating life of the battery pack/motor vehicle by automatically distinguishing and characterizing electrical short conditions, and subsequently determining corresponding charging or discharging battery limits in view of such characterizations.

In particular, the present disclosure contemplates implementation of a computer-executable methodology that, when executed aboard the motor vehicle, automatically adapts battery usage limits to extend battery availability and longevity. For instance, lowering a charge termination limit could reduce overall energy stored, as well as voltage potential across a degrading cell. Hence, the act of lowering a charge termination limit may be a long term method to delay repair, at least until the internal resistance lowers to a point where continued operation is not possible or permissible.

The enabled strategy, which is based in part on an estimated state of the constituent battery cells of the battery pack, is intended to increase vehicle availability as the battery pack ages and/or begins to fail, but has not yet actually reached its definitive end of life. The disclosed method closely monitors battery cell behavior in order to determine an indication of the health of the individual cells, and then determines usable thresholds for preserving battery life and maintaining operation of the battery pack. The present approach may be utilized alone or as a part of an overall battery charging/battery control arbitration strategy that also comprehends other factors for ensuring the desired battery life extension and energy utilization.

In a non-limiting exemplary embodiment, a method is described herein for adapting a usage level of a battery pack having a plurality of battery cells. The method in this embodiment includes measuring cell sense data for each respective one of the battery cells, using a cell sense circuit. The cell sense data includes a cell voltage, current, and temperature. The method also includes processing the cell sense data for each respective battery cell, through multiple battery state functions of a controller. In this manner, the controller generates a plurality of numeric cell degradation values (CDVs) as described in detail herein. The battery state functions are calibrated relationships of the cell sense data to predetermined battery fault conditions. The controller, as part of the method, thereafter automatically adapts the usage level of the battery pack during its operation based on the numeric CDVs.

The predetermined battery fault conditions may vary with the intended end use/application. In a possible embodiment, the battery fault conditions include an intermittent or a sustained electrical short condition within the respective battery cell. In such an embodiment, the battery state functions could include an electrical short function indicative of the intermittent or sustained electrical short condition.

Alternatively or concurrently, the predetermined battery fault conditions may include active material plating of the respective battery cells, with the battery state functions possibly including a plating function indicative of a level of the active material plating. Other battery fault conditions may include a diminished energy holding capacity of the respective battery cells, in which case the battery state functions could include a capacity function indicative of the diminished energy holding capacity. In addition to reacting to diminished capacity, the present approach could also modify the control limits when possible in order to protect capacity, e.g., using navigation/route planning information as an input when determining limits.

Elevated or reduced temperatures of the respective battery cells may likewise be used, with the battery state functions possibly including a temperature function indicative of elevated or reduced temperature. Still other predetermined battery fault conditions could include an electrolyte leakage condition of the respective battery cell, with the battery state functions including an electrolyte leakage function indicative of the electrolyte leakage condition.

In some embodiments of the present method, automatically adapting the usage level of the battery pack may include modifying calibrated charging limits and/or thermal limits of the battery pack during a charging operation of the battery pack, and/or modifying calibrated discharging limits and/or thermal limits of the battery pack during a discharging operation of the battery pack.

For instance, the controller may automatically adapt the usage level of the battery pack by automatically modifying a charging behavior of an offboard charging station and/or an onboard solar panel.

Processing the cell sense data through the battery state function may optionally include processing the cell sense data and at least one additional powertrain control factor of the above-noted motor vehicle through an arbitration logic block of the controller. In such a configuration, automatically adapting the usage level of the battery pack may include assigning a relative weight to each respective one of the multiple battery state functions and the additional powertrain control factor via the arbitration logic block.

The additional powertrain control factor may include, by way of example, a life modeling limit, an energy/regeneration optimization limit, and/or a navigation/route planning-based limit of the electric powertrain.

An electrified powertrain system is also disclosed herein. In an exemplary embodiment, the powertrain system includes a battery pack having a plurality of battery cells and a cell sense circuit, with the cell sense circuit being configured to measure cell sense data for each of the battery cells. Additionally, the powertrain system in this embodiment includes a rotary electric machine that is electrically connected to the battery pack. The battery pack is configured to supply electrical energy to the rotary electric machine in a discharging mode, and to receive electrical energy during a charging mode, e.g., from an offboard charging station, an onboard solar panel/system, or the electric machine. As part of the powertrain system, a controller is in communication with the cell sense circuit and the rotary electric machine, with the controller configured to execute the above-noted exemplary method.

The above-noted and other features and advantages of the present disclosure will be readily apparent from the following detailed description of the embodiments and best modes for carrying out the disclosure when taken in connection with the accompanying drawings and appended claims.

DETAILED DESCRIPTION

Figure 1:
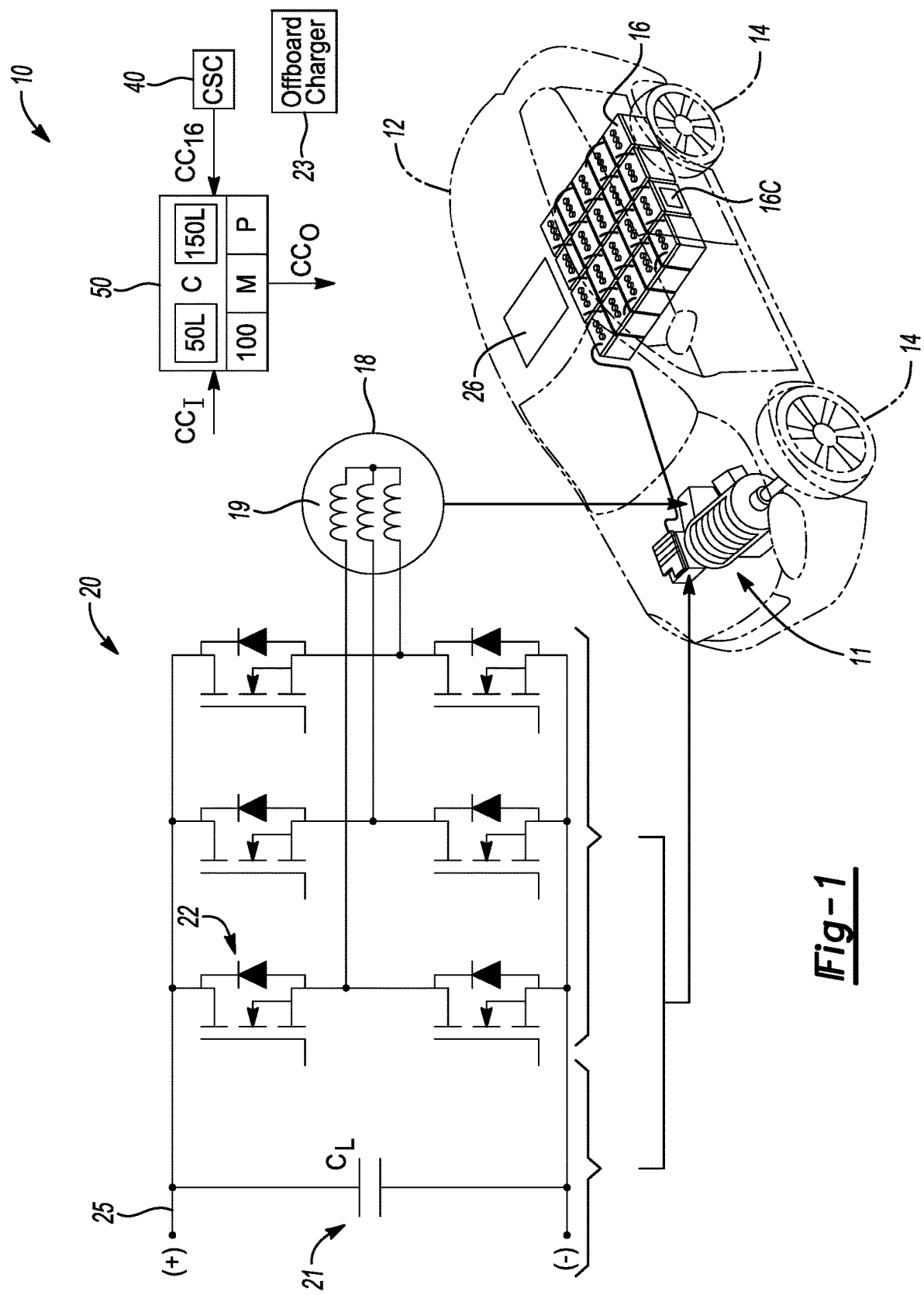
FIG. 1 is a schematic illustration of an exemplary motor vehicle having an electric powertrain, a high-voltage propulsion battery pack, and a controller configured to execute the present method.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like components, FIG. 1 schematically depicts a motor vehicle 10 having an electrified powertrain system 11. The electrified powertrain system 11 includes a high-voltage propulsion battery pack 16, e.g., a multi-cell lithium-ion, nickel-metal hydride, or another application-suitable electrochemical battery. In the illustrated exemplary configuration, the motor vehicle 10 also includes a vehicle body 12 connected to a set of road wheels 14, with the propulsion battery pack 16 mounted to the vehicle body 12 at a suitable position, such as under a floor panel (not shown) in a representative low-profile/planar arrangement.

The electrified powertrain system 11 contemplated herein also includes a controller (C) 50 programmed with control logic 50L and 150L, which are used to execute instructions embodying a method 100. Representative embodiments of the control logic 50L and 150L are described below with reference to FIGS. 2 and 3, respectively, while an exemplary embodiment of the method 100 is shown in FIG. 4. As described in detail below, execution of the method 100 allows the controller 50 to closely monitor battery cell behavior of the propulsion battery pack 16 in order to characterize the health of its individual cells, and then determines usable thresholds for preserving life and maintaining operation of the propulsion battery pack 16. As noted above, the present solution may be utilized alone or as a part of an overall battery charging/battery control arbitration strategy that also comprehends other factors for ensuring the desired battery life extension and energy utilization.

In terms of charging of the propulsion battery pack 16, the motor vehicle 10 and its electrified powertrain system 11 in various embodiments may be configured to provide a charging current to the propulsion battery pack 16 during regenerating event, i.e., by capturing kinetic energy during braking and using the same to power a rotary electric machine 18 or another suitable device as an electric generator. The propulsion battery pack 16 may also be charged via an offboard charging station 23, for instance a direct current (DC) fast charging station or a home charging outlet as appreciated in the art. The motor vehicle 10 could also be equipped with one or more solar panels 26, enabling the motor vehicle 10 to generate an onboard charging current. The various charging scenarios and associated limits are therefore factors considered herein as part of the present strategy, as detailed below.

The motor vehicle 10 as depicted in the simplified exemplary embodiment of FIG. 1 includes an alternating current (AC) embodiment of the rotary electric machine 18. Although the rotary electric machine 18 is capable of both motoring and generating functions in its capacity as a motor-generator unit, the rotary electric machine 18 is referred to hereinafter as a traction motor 18 for simplicity. Phase windings 19 of the traction motor 18 are electrically connected to a power inverter module 20, which in turn includes or is connected in parallel with a direct current (DC) link capacitor 21 ($C_L$). The power inverter module 20 is connected to a DC voltage bus 25, with the link capacitor 21 connected between positive (+) and negative (−) rails of the DC voltage bus 25 as shown.

As appreciated in the art, a power inverter such as the representative power inverter module 20 includes semiconductor switching dies 22, e.g., Metal Oxide Semiconductor Field Effect Transistors (MOSFETs) as shown, Insulated Gate Bipolar Transistors (IGBTS), Silicon Controlled Rectifier (SCR), thyristors, etc., which are arranged in nominal top and bottom locations. Each electrical phase of the traction motor 19 shown in FIG. 1 thus has a corresponding top/high/positive and bottom/low/negative switching pair. The traction motor 18 is embodied as a three-phase device in the non-limiting embodiment of FIG. 1, and thus the power inverter module 20 has three phase leads 19 as shown. Single-phase embodiments may be envisioned within the scope of the disclosure, as well as embodiments having more than three phases, and therefore the number of traction motors 18 and corresponding phases will vary with the intended application and construction of the motor vehicle 10 or another mobile platform.

Primary torque functions of the electric machine 18 are regulated in real time via control signals (arrow $CC_O$) from a controller (C) 50. Instructions for implementing a control strategy in accordance with the present disclosure are embodied as a method 100, an example of which is explained below with reference to FIG. 3. Such instructions may be recorded in memory (M) of the controller 50 and executed by one or more processors (P) thereof to provide the benefits described herein.

Other components not depicted in FIG. 1 may be included within the electrified powertrain system 11, such as but not limited to a DC-DC converter and an auxiliary battery. As noted above, auxiliary voltage levels are typically 12-15V, and therefore a DC-DC converter is operable through internal switching operations and signal filtering, as understood in the art, to receive a relatively high DC voltage from the DC voltage bus 25 and output a lower auxiliary voltage to the auxiliary battery. The traction motor 18 is therefore just one of several devices aboard the motor vehicle 10 that possibly require a discharge of electrical energy from the propulsion battery pack 16.

As part of the present method 100, the controller 50 determines battery limits for control of a high-voltage propulsion battery pack, and in particular for maximizing availability and longevity thereof. While the term "high-voltage" is relative to the typical 12-15V auxiliary/low voltage levels noted above, and thus "high-voltage" may entail voltage levels in excess thereof, exemplary hybrid electric vehicle or full battery electric vehicle propulsion applications of the types contemplated herein may require the propulsion battery pack 16 to have a voltage capability of, for instance, 300V or more.

Within the scope of the present disclosure, the controller 50 determines a state of health of constituent battery cells of the propulsion battery pack 16 of FIG. 1, and makes charge/discharge limit adjustments based thereon. Vehicle availability is expected to increase as a result of the method 100 as the propulsion battery pack 16 ages or begins to fail. The method 100 is thus predicated on real-time monitoring by the controller 50 of individual cell behavior when determining usable thresholds for preserving life and maintaining desired operation of the propulsion battery pack 16.

The controller 50 is thus configured for measuring cell sense data (arrow $CC_{16}$) for each respective one of the battery cells 16C of the propulsion battery pack 16 using a cell sense circuit (CSC) 40 of the type appreciated in the art, with the cell sense data (arrow $CC_{16}$) including a cell voltage, a cell current, and a cell temperature, either as a separate data stream or as part of a set of input signals (arrow $CC_I$) to the controller 50. As appreciated in the art, resistance and other possible values may be derived from such exemplary data, and thus are included within the scope of the set of input signals (arrow $CC_I$).

As part of the general functionality of the controller 50, during a discharging mode in which electrical energy from the propulsion battery pack 16 is directed to the individual phase windings 19 of the traction motor(s) 18, the controller 50 receives the input signals (arrow $CC_I$), which in turn are collectively indicative of a total power requirement, e.g., a driver-requested and/or autonomously determined output torque or speed request. The controller 50 then discharges the propulsion battery pack 16 according to a set of battery control limits, e.g., voltage, current, and temperature limits.

The term "controller" as used herein for descriptive simplicity may include one or more electronic control modules, units, processors, and associated hardware components thereof, e.g., Application Specific Integrated Circuits (ASICs), systems-on-a-chip (SoCs), electronic circuits, and other hardware as needed to provide the programmed functionality. The controller 50 may be embodied as one or more electronic control units or computational nodes responsive to the input signals (arrow $CC_I$). The controller 50 includes application-specific amounts and type of the memory (M) and one or more of the processor(s) (P), e.g., microprocessors or central processing units, as well as other associated hardware and software, for instance a digital clock or timer, input/output circuitry, buffer circuitry, etc.

Figure 2:
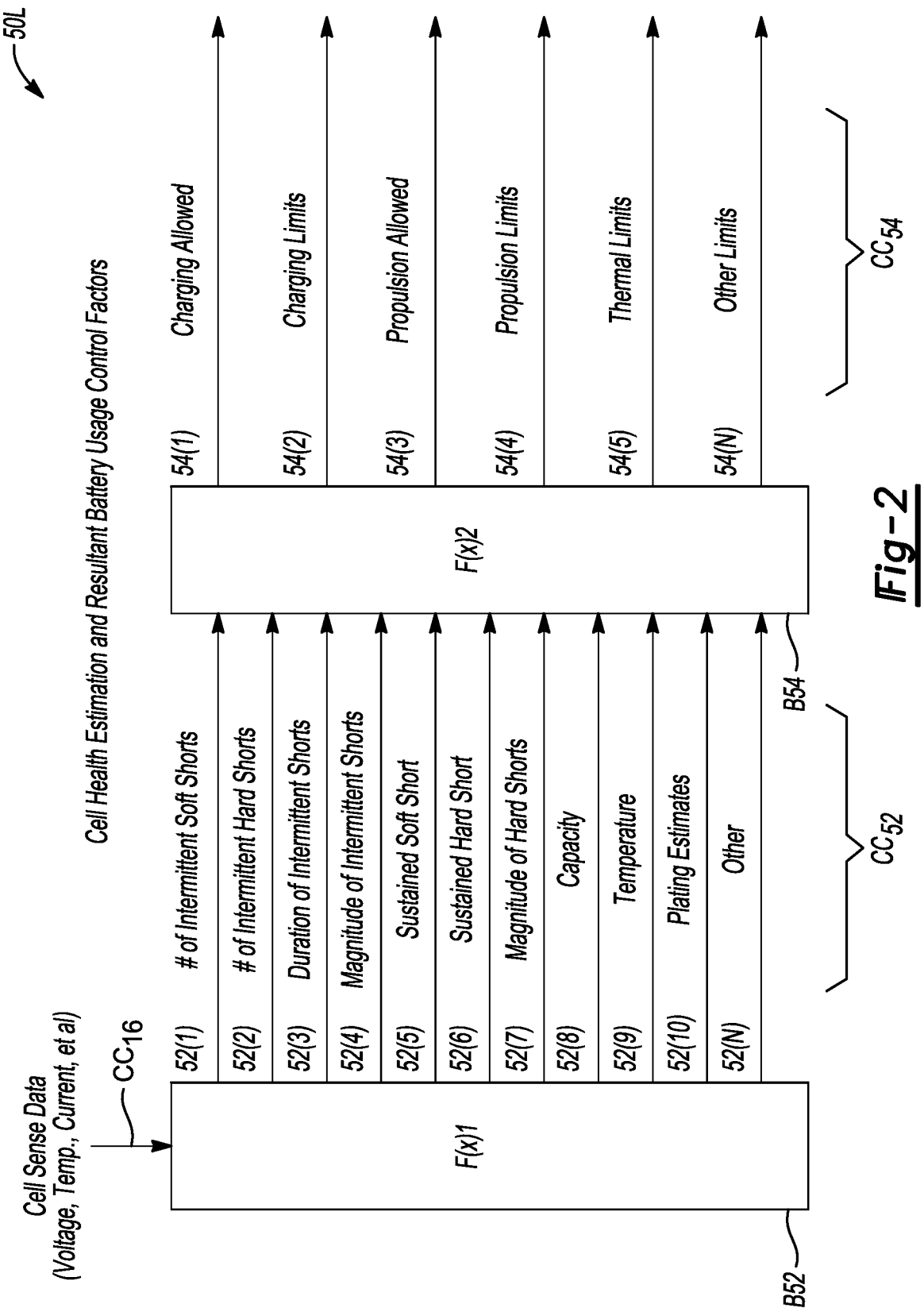
FIG. 2 is a schematic illustration of representative control logic of the controller shown in FIG. 1.

Referring to FIG. 2, the control logic 50L is shown schematically in the form of logic blocks B52 and B54, which could be implemented as a combination of electronic hardware and corresponding software to provide the described functions. In the illustrated configuration, for instance, logic block B52 may receive the cell sense data (arrow $CC_{16}$) from the cell sense circuit 40 shown in FIG. 1, including cell voltage, temperature, and current, and possibly other values. The cell sense data (arrow $CC_{16}$) is processed through a first set of functions, F(x)1, to generate N different output signals ($CC_{52}$), which act herein as numeric cell degradation values or CDVs in the context of method 100 as set forth below. In the non-limiting illustrative embodiment of FIG. 2, such output signals ($CC_{52}$) are individually labeled as 52(1), 52(2), . . . , 52(N) for illustrative clarity.

While the first set of functions F(x)1 could vary with the intended end use and application, one or more of the illustrated example output signals ($CC_{52}$) could be used in a typical propulsion application. For instance, outputs 52(1) and 52(2) may correspond to the number of intermittent soft and hard shorts, respectively, as observed and counted by the controller 50 over a predetermined interval. Outputs 52(3) and 52(4) in such an embodiment may correspond to the observed duration and magnitude of such intermittent short conditions. Likewise, outputs 52(5) and 52(6) could be used to track sustained soft shorts and sustained hard shorts, with output 52(7) possibly corresponding to the magnitude of the latter. Additional outputs 52(8) and 52(9) could track capacity and temperature of the constituent battery cells 16C.

Output 52(10) in particular could possibly be an estimated level of plating of the battery cells 16C, e.g., using a time-based model and/or a formula-based approach. As appreciated in the art, plating occurs in response to aggressive charging or discharging currents. During plating, active materials are deposited as a solid film, e.g., metallic lithium when using a typical lithium-ion battery composition. The presence of plating on a given battery cell 16C, left unaddressed, may lead to electrical faults such as the above-noted short circuit conditions, and adversely affects the life, charging rate, and durability of the propulsion battery pack 16.

Other outputs, nominally labeled 52(N) in FIG. 2, may likewise be provided by logic block B52, including for instance a level of electrolyte leakage from a given battery cell 16C. The various outputs 52(1), 52(2), . . . , 52(N), once again, will vary with the application, and thus the illustrated outputs are just some of the possible faults that may be detected or estimated from the instantaneous values and/or trends in the cell sense data ($CC_{16}$).

Still referring to FIG. 2, logic block B54 includes a second set of functions F(x)2 configured receive the output signals ($CC_{52}$) from logic block B52, and to thereafter generate control signals ($CC_{54}$) for use in controlling the electrified powertrain system 11 of FIG. 1. Control signals ($CC_{54}$) are thus part of the broader set of control signals (arrow $CC_O$) shown in FIG. 1. As with logic block B52 upstream of logic block B54, the control signals ($CC_{54}$) include a corresponding set of outputs, in this case outputs 54(1), 54(2), . . . , 54(N). Representative outputs 54(1) and 54(2) could include charging permissions ("Charging Allowed") and charging limits, respectively. Analogously, outputs 54(3) and 54(4) could correspond to discharging permissions ("Propulsion Allowed") and propulsion limits, e.g., torque and/or speed limits of the traction motor 18 of FIG. 1 and/or the motor vehicle 10 as a whole in the event other propulsors are included. Output 54(5) may assign thermal limits, such by permitting further operation of the propulsion battery pack 16 under reduced temperatures, which could coincide, as an additional control action, with flow control of a thermal regulation system (not shown). Other outputs, nominally labeled 54(N) ("Other Limits"), may be provided by logic block B54, alone or in addition to the representative outputs 54(1), 54(2), . . . , 54(N), and therefore the various examples of FIG. 2 are intended to be illustrative of the present teachings and non-limiting.

Figure 3:
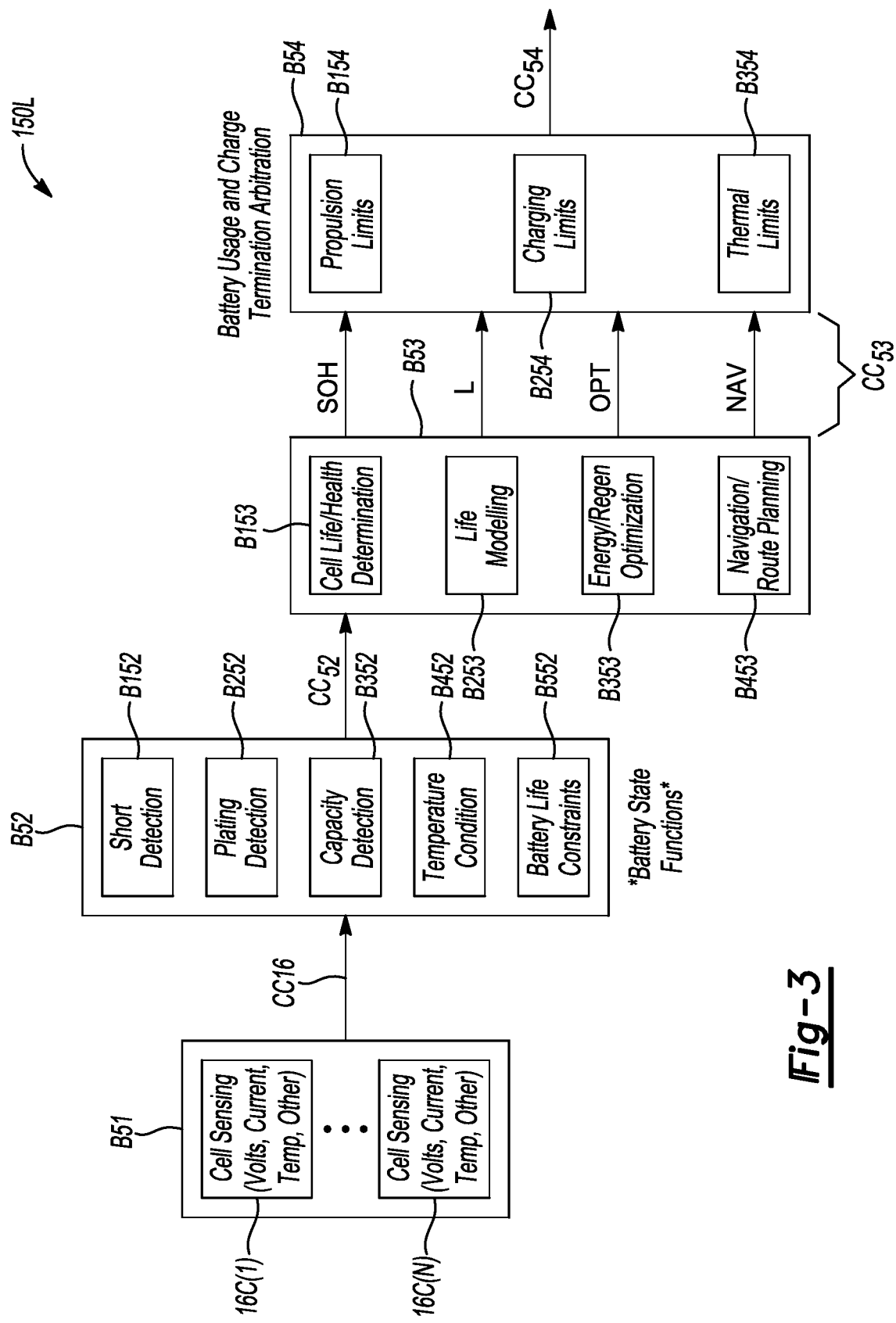
FIG. 3 is a schematic logic flow diagram depicting an application of the present method usable aboard the motor vehicle of FIG. 1.
Figure 4:
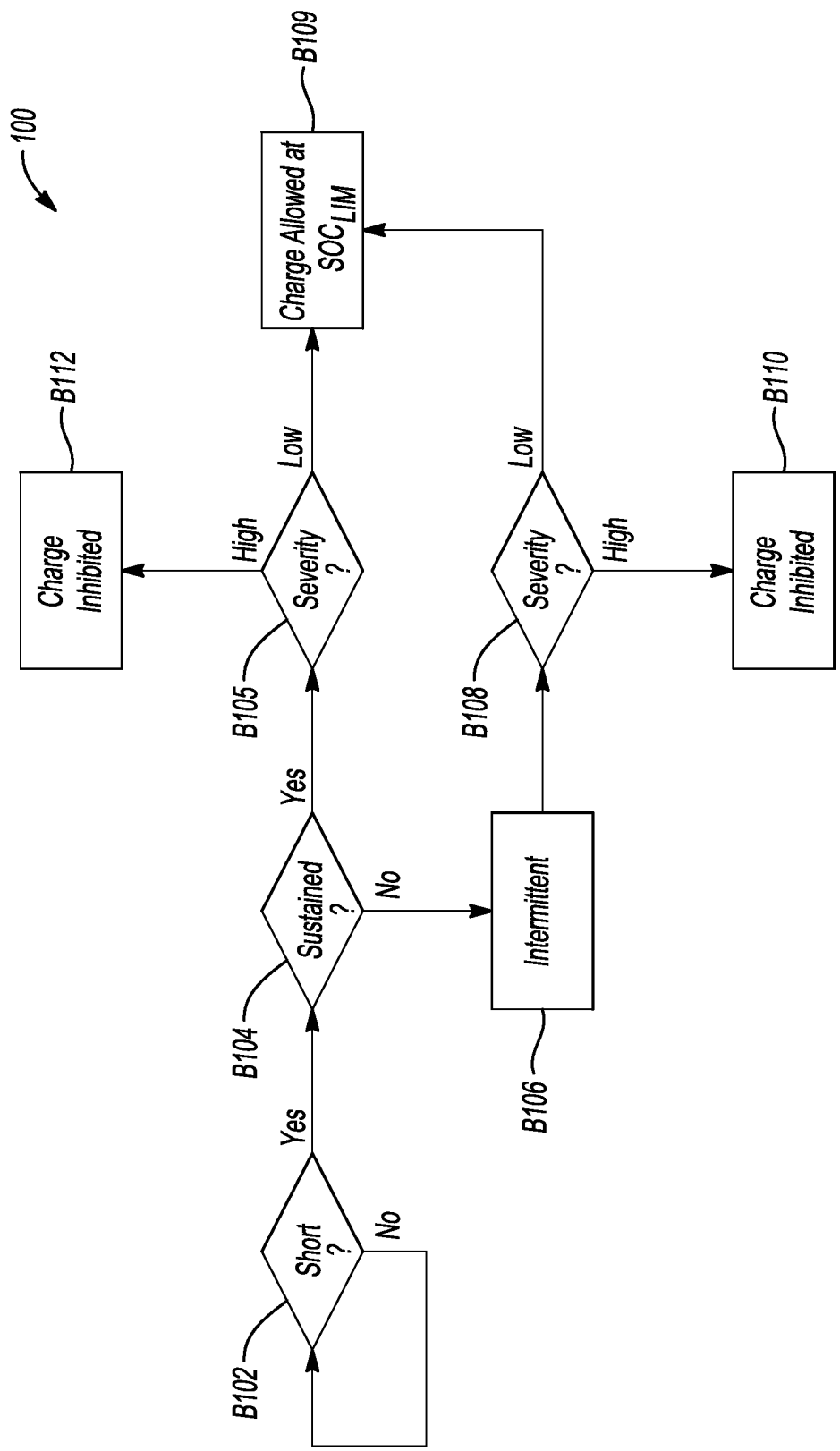
FIG. 4 is a flow chart describing an exemplary embodiment of the present method.

Referring to FIG. 3, the control logic 150L is shown schematically in the form of logic blocks B51, B52, B53, and B54, with logic blocks B52 and B54 generally described with reference to FIG. 2. As with logic blocks B52 and B54, logic blocks B51 and B53 could be implemented as a combination of electronic hardware and corresponding software to provide the described functions. In the illustrated configuration, logic block B51 may be used as part of the cell sense board 40 shown schematically in FIG. 1 to measure cell sense data (arrow $CC_{16}$) for each of the various battery cells 16C, i.e., 16C(1), . . . , 16C(N) as shown. In a typical measurement, such cell sense data (arrow $CC_{16}$) may include a corresponding cell voltage, cell current, and cell temperature, and possibly other measured characteristics. The cell sense data (arrow $CC_{16}$) is then transmitted to logic block B52.

Logic block B52, shown more generically in FIG. 2, provides a collective set of battery state functions, with the various functions possibly implemented via corresponding functional blocks B152-B552 when determining the various outputs 52(1), . . . , 52(N) described above. Such outputs collectively define the output signals (arrow $CC_{52}$), which themselves act as the above-noted numeric cell degradation values or CDVs. In the simplified FIG. 3 embodiment, for example, logic block B52 could include a dedicated functional block B152 for detecting short conditions, and another functional block B252 for detecting plating of the battery cells 16C. For instance, functional blocks B152 and B252 could observe cell voltages and patterns, then compare the same to calibrated performance tables to see if the instantaneous values or trends are indicative of such fault conditions. Likewise, a separate functional block B352 could process the cell sense data (arrow $CC_{16}$) to detect a temperature condition, e.g., a higher or lower than expected cell temperature, while functional block B452 could relay calibrated battery life constraints, e.g., from memory (M) of the controller 50.

Downstream of logic block B52, logic block B53 could be used to individually process one or more of the output signals ($CC_{52}$) through corresponding functions. For example, functional block B153 ("Cell Life/Health Determination") could output a numeric state of health (SOH), e.g., as a normalized value in which 0 corresponds to a fully depleted or dead battery cell 16C and 1 corresponds to a properly functioning new battery cell 16C, while a functional block B253 ("Life Modeling") could output an estimated remaining life (arrow L). Functional block B353 ("Energy/Regen Optimization") could provide an optimization value (arrow OPT) based on the present state of the battery cell 16C, e.g., from a cost function informed by the present state. Such an optimization value could be used downstream by logic block B54 when enacting certain control actions in response to the signals (arrow $CC_{53}$). Another functional block B453 likewise could be implemented to account for navigation/route planning expectations, outputting a navigation request (arrow NAV) to logic block B54. In terms of possible navigation functionality, the present approach could modify control limits when possible based on navigation/route planning information in order to protect capacity, e.g., for satisfying such a navigation request (arrow NAV).

With respect to logic block B54, also described above and depicted in FIG. 3, this aspect of the programmed functionality of the controller 50 is directed to arbitrating usage of the propulsion battery pack 16 of FIG. 1 during both charging and discharging operations. Like the other representative logic blocks B51, B52, and B53, logic block B54 may be configured with separate functional blocks, i.e., B154, B254, and B354 in the simplified example of FIG. 3. In this example, functional block B154 could be used to enforce propulsion limits on the electrified powertrain system 11 of FIG. 1, such as by setting lower maximum torque or speed limits accounting for the states as analyzed upstream by logic block B52. Functional block B154 thus acts during discharging modes to protect the propulsion battery pack 16 while enabling its extended use relative to control methodologies that respond to detected short conditions by preventing or severely reducing propulsion operations.

Functional block B254 of FIG. 3 is analogous to functional block B154, acting during charging modes to enforce charging current or voltage limits, or to reduce or extend charging durations as needed to protect the propulsion battery pack 16. As with functional block B154, functional block B254 sets limits in a manner that extends use of the battery pack 16 relative to control methodologies that respond to detected short conditions by preventing or severely reducing charging operations. Functional block B354 ("Thermal Limits") could be used in a similar manner by adjusting calibrated thermal maximum/minimum operating limits of the battery pack 16, with such a control action possibly including controlling operation of a thermal management system (not shown), e.g., by circulating coolant through the propulsion battery pack 16 at a higher rate to maintain a lower battery temperature. The various outputs of functional blocks B154, B254, and B354 collectively form the control signals (arrow $CC_{54}$) described above with reference to FIG. 3, which are ultimately used in controlling the electrified powertrain system 11 of FIG. 1.

The method 100 executed by the controller 50 shown in FIG. 1, with the assistance of the exemplary control logic 50L and 150L of FIGS. 2 and 3, respectively, thus entails measuring the cell sense data ($CC_{16}$) for each respective one of the battery cells 16C using the cell sense circuit 40 of FIG. 1. As noted above and as appreciated in the art, the cell sense data ($CC_{16}$) includes, for each respective battery cell 16C, a cell voltage, a cell current, and a cell temperature, which are measurable using corresponding sensor traces (not shown), e.g., of a printed circuit board mounted to exposed electrode tabs or other suitable surfaces of the battery cells 16C.

The method 100 includes processing the measured cell sense data ($CC_{16}$) for each respective battery cell 16C through the multiple battery state functions of the controller 50, e.g., using logic block B52 of FIGS. 2 and 3, to thereby generate the plurality of numeric cell degradation values (CDVs), i.e., output signals $CC_{52}$. Within the scope of the present disclosure, the multiple battery state functions, collectively labeled F(x)1 in FIG. 2, are calibrated relationships of the cell sense data ($CC_{16}$) to predetermined battery fault conditions, such as the magnitude and duration of electrical short conditions, fault conditions of the battery cells 16C, e.g., electrical short magnitude, frequency, and duration, cell capacity, cell temperature, plating estimates, and/or other application-suitable characteristics. The controller 50 thereafter automatically adapts the usage level of the propulsion battery pack 16 of FIG. 1 during operation thereof based on the numeric CDVs, such as via formula or threshold-based adjustments and/or lookup table-assisted control actions, that to at least some extent serve to extend operation of the battery pack 16 in spite of the indicated fault conditions.

Exemplary control actions taken by the controller 50 include modifying calibrated charging limits and/or thermal limits of the propulsion battery pack 16 during a charging operation thereof. Similarly, the controller 50 may modify calibrated discharging limits and/or thermal limits of the propulsion battery pack 16 during a discharging operation of the propulsion battery pack 16, such as a drive mode during which the traction motor(s) 18 of FIG. 1 are used to propel the motor vehicle 10 in a torque or speed mode.

As described above with reference to FIGS. 2 and 3, predetermined battery fault conditions within the scope of the present disclosure may include intermittent or sustained electrical short conditions within the respective battery cells 16C, with the multiple battery state functions of logic block B52 of FIG. 2 possibly including an electrical short function indicative of the intermittent or sustained electrical short condition. Such battery fault conditions could likewise include active material plating of the respective battery cells 16C, with the multiple battery state functions including a plating function indicative of a level of the active material plating in such an embodiment.

Other examples of the battery fault conditions include a diminished energy holding capacity of the respective battery cells 16C, with the multiple battery state functions of logic block B52 including a capacity function indicative of the diminished energy holding capacity. Elevated or reduced temperatures of the respective battery cells 16C may also be a relevant fault condition, with the battery state functions of logic block B52 including a temperature function indicative of the elevated or reduced temperature. Other fault conditions such as an electrolyte leakage condition of the respective battery cells 16C could be considered as well, in which case the battery state functions could include an electrolyte leakage function indicative of the electrolyte leakage condition.

Processing the cell sense data ($CC_{16}$) through the above-noted multiple battery state functions of logic block B52 may include processing the cell sense data ($CC_{16}$) and at least one additional powertrain control factor of the motor vehicle 10 shown in FIG. 1 through an arbitration logic block of the controller 50, which could reside within logic block B54 of FIG. 3. The controller 50 may automatically adapt the usage level of the battery pack 16 in such an exemplary embodiment by assigning a relative weight to each respective one of the multiple battery state functions of logic block B52 and the additional powertrain control factor via the arbitration logic block. By way of example and not limitation, the additional powertrain control factor includes a life modeling limit, an energy/regeneration optimization limit, or a navigation/route planning-based change or limit of the electric powertrain. That is, not all modifications will be limits per se. For example, due to an early warning of an impending or actual failure, the controller 50 may divert to only Level 2 chargers vs Level 3 chargers, or the controller 50 might route using a different path to get to a different charging source. Such efforts protect and extend the battery pack 16 indirectly, but would be seen by the user as a simple route modification.

Referring to FIG. 4, the method 100 is described according to an embodiment in which the controller 50 of FIG. 1 tracks an electrical short circuit condition. Those skilled in the art will appreciate that other fault conditions may be monitored, processed using the control logic 50L and 150L, and used by the controller 50 to extend the life of the propulsion battery pack 16 of FIG. 1 within the scope of the disclosure. Therefore, the exemplary electrical short case is intended to be illustrative of the present teachings and non-limiting.

The method 100 shown in FIG. 4 commences at block B102 with detection, by the controller 50, of an electrical short condition. As described above, the controller 50 uses the cell sense data (arrow $CC_{16}$) communicated via the cell sense circuit 40 of FIG. 1 to detect such a fault, e.g., by comparing cell voltages or voltage trends/trajectories to an expected "normal"/non-shorted voltage performance. The method 100 proceeds to block B104 when the controller 50 has detected the electrical short condition.

Block B104 includes determining a duration of the short condition detected at block B102. The controller 50 could initiate a timer when the short condition is detected, for instance, and record the elapsed time in the short condition in its memory (M). The controller 50 proceeds to block B105 when the short condition is a sustained short condition, i.e., the short condition continues unabated for at least a calibrated duration. That is, the controller 50 may be programmed with a threshold amount of time, below which the short condition is deemed to be transient, and above which the short condition is considered to be sustained. The method 100 proceeds to block B105 when the short condition is sustained, relative to such a threshold time, and to block B106 in the alternative when the controller 50 determines that the short condition is intermittent.

Block B105 of FIG. 4 entails evaluating the severity of the sustained electrical short condition. For instance, the controller 50 may compare the magnitude of the short condition to a predetermined value to determine if the severity is high or low, with such a predetermined value being calibrated or possibly calibratable to enable platform-specific flexibility. In an exemplary implementation, the controller 50 could count the number of the battery cells 16C of FIG. 1 experiencing the sustained short condition, and use this number and/or a total elapsed time under such a sustained short condition to determine if the severity is high or low for the purposes of block B105. The method 100 proceeds to block B109 when the controller 50 determines that the severity of the sustained short condition is low, and to block B112 in the alternative when the severity is deemed to be high.

At block B106, the controller 50 of FIG. 1 registers in its memory (M), e.g., as a bit flag or diagnostic code, that the short condition detected at block B102 is intermittent, i.e., not continuous beyond the time threshold evaluated in block B104 as described above. The method 100 proceeds to block B108 when the intermittent short condition has been registered.

Block B108, which is analogous to block B105 described above and thus may be executed in a similar manner, entails evaluating the severity of the intermittent electrical short condition. However, unlike the block B105 evaluation of magnitude when determining severity of a sustained short condition, the evaluation at block B108 may look to other factors relevant to intermittency.

Block B109 includes executing a control action via the controller 50 in response to the determination at block B105 that a sustained electrical short condition is of an objectively low severity. During a representative charging process of the propulsion battery pack 16, for example, this may include allowing a charging event to occur at an increased state of charge limit ($SOC_{LIM}$). For example, if depletion of the propulsion battery pack 16 to a SOC limit of 10-20% would typically occur before charging is initiated, the controller 50 may, in conjunction with the offboard charging station 23, permit charging to proceed at a higher SOC limit, e.g., 20-30% or some other appropriate SOC level. Other charge control variations may be used in different embodiments to reduce electrical stress and loading of the propulsion battery pack 16 relative to default SOC limits used to trigger a charging event for a properly functioning/new propulsion battery pack 16. Thus, control actions may include modifying charging behavior of the offboard charging station 23, e.g., a Level 1, 2, or 3 charger.

Blocks B110 and B112, which are analogous to each other, the controller 50 may inhibit charging of the propulsion battery pack 16 by the above-noted offboard charging station 23, or by the solar panel(s) 26. Block B110, for instance, is arrived at upon a determination at blocks B106 and B108 that an intermittent fault of a high severity is present in one or more battery cells 16C of the propulsion battery pack 16. Similarly, block B112 is executed in response to a determination at blocks B104 and B105 that a sustained fault of a high severity is present in the battery cell(s) 16C.

Charge inhibiting within the context of blocks B110 and B112 may include disabling charging functionality, such as via activation of electrical contactors (not shown) to fully disconnect the propulsion battery pack 16. Alternatively, blocks B110 and B112 could allow very limited charging to occur, up to a threshold low SOC limit, e.g., 50-60% or less, to provide limited propulsion capability, perhaps limited to a certain number of charging cycles with attendant warnings to the operator before disabling charging.

Optionally, as part of the method 100 the controller 50 could be configured to automatically identify Charge Termination Limit (CTL) modification requestors, such as output signals from other component systems of the electrified powertrain system 11 of FIG. 1, e.g., a battery controller or a vehicle integrated control module (not shown). In such an embodiment, the controller 50 could arbitrate therebetween the different CTL modification requestors as part of the control actions of blocks B109, B10 and B112. Arbitration may entail selecting a lower charging limit or, when one is called for through execution of the method 100, possibly defaulting to blocks B110 and B112 when such external requestors have a higher priority. Some implementations may also work with the offboard charging station 23 of FIG. 1 to limit the charging rate of the propulsion battery pack 16, e.g., for longevity and/or reliability reasons. Thus, adjusted charging limits could be applied to advantage in the state of charge (SOC) domain and/or with respect to the actual charging voltage.

As will be appreciated by those skilled in the art in view of the foregoing disclosure, the present strategy establishes a defined relationship between perceived electrical faults or other deviant cell behavior of the battery cells 16C and usability of the motor vehicle 10 shown in FIG. 1. This occurs by observing cell parameters via the controller 50, and by detecting potential adverse events, while accounting for frequency and severity of detected conditions indicative of possible internal electrical shorts. The present strategy thus determines severity of intermittent or sustained faults, such as the exemplary internal electrical shorts treated in FIG. 4, and bases usability decisions of the motor vehicle 10 thereon, unlike control strategies in which a control system reactively prevents battery charging operations based on a detected fault.

Such reactive approaches can create a problem for aging vehicles displaying similar cell behavior due to natural variation in cell degradation. Thus, the present teachings help to establish a framework in which availability of the motor vehicle 10 in propulsion or charging modes is increased as the controller 50 of FIG. 1 learns more about the various failure modes and behavior of the battery cells 16 during natural aging. This relationship is then used by the controller 50 to adapt battery usage limits and remedial action levels in a manner that extends the usable life of the battery pack 16 while remaining within defined operating limits. Also enabled by the present disclosure is an application of the health estimates into an overall battery charging/usage arbitration that possibly includes other factors, such as but not limited to strategic life protection, navigation/location based energy optimization, regenerative braking optimization, and/or friction brake minimization. These and other benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

The invention claimed is:

1. A method for adapting a usage level of a battery pack having a plurality of battery cells, the method comprising:
   measuring cell sense data for each respective one of the battery cells using a cell sense circuit, the cell sense data including a cell voltage, a cell current, and a cell temperature;
   processing the cell sense data, for each respective battery cell of the plurality of battery cells, through multiple battery state functions of a controller to thereby generate a plurality of numeric cell degradation values (CDVs), wherein the multiple battery state functions are calibrated relationships of the cell sense data to predetermined battery fault conditions;
   automatically adapting the usage level of the battery pack during operation of the battery pack, via the controller, based on the numeric CDVs; and
   wherein automatically adapting the usage level of the battery pack during operation of the battery pack includes controlling operation of an offboard charging station and/or an onboard solar panel during a charging operation of the battery pack.

2. The method of claim 1, wherein the predetermined battery fault conditions include an intermittent or sustained electrical short condition within the respective battery cell, and wherein the multiple battery state functions include an electrical short function indicative of the intermittent or sustained electrical short condition.

3. The method of claim 1, wherein the predetermined battery fault conditions include active material plating of the respective battery cell, and wherein the multiple battery state functions include a plating function indicative of a level of the active material plating.

4. The method of claim 1, wherein the predetermined battery fault conditions include a diminished energy holding capacity of the respective battery cell, and wherein the multiple battery state functions include a capacity function indicative of the diminished energy holding capacity.

5. The method of claim 1, wherein the predetermined battery fault conditions include an elevated or reduced temperature of the respective battery cell, and wherein the multiple battery state functions include a temperature function indicative of the elevated or reduced temperature.

6. The method of claim 1, wherein the predetermined battery fault conditions include an electrolyte leakage condition of the respective battery cell, and wherein the multiple battery state functions include an electrolyte leakage function indicative of the electrolyte leakage condition.

7. The method of claim 1, wherein automatically adapting the usage level of the battery pack includes modifying calibrated charging limits, charging rates, and/or thermal limits of the battery pack during the charging operation of the battery pack.

8. The method of claim 1, wherein automatically adapting the usage level of the battery pack includes modifying calibrated discharging limits and/or thermal limits of the battery pack during a discharging operation of the battery pack.

9. The method of claim 1, wherein processing the cell sense data through the multiple battery state functions includes processing the cell sense data and at least one additional powertrain control factor of a motor vehicle through an arbitration logic block of the controller, and wherein automatically adapting the usage level of the battery pack includes assigning a relative weight to each respective one of the multiple battery state functions and the additional powertrain control factor via the arbitration logic block.

10. The method of claim 9, wherein the additional powertrain control factor includes a life modeling limit, an energy/regeneration optimization limit, or a navigation/route planning-based limit of the motor vehicle.

11. An electric powertrain system comprising:
    a battery pack having a plurality of battery cells and a cell sense circuit, the cell sense circuit being configured to measure cell sense data for each respective one of the battery cells;
    a rotary electric machine that is electrically connected to the battery pack, wherein the battery pack is configured to supply electrical energy to the rotary electric machine in a discharging mode, and to receive electrical energy from the rotary electric machine, an offboard charging station, and/or a solar panel in a charging mode; and
    a controller in communication with the cell sense circuit and the rotary electric machine, wherein the controller is configured to:
      receive the cell sense data for each respective one of the battery cells from the cell sense circuit, the cell sense data including a cell voltage, a cell current, and a cell temperature;
      process the cell sense data, for each respective battery cell of the plurality of battery cells, through multiple battery state functions to thereby generate a plurality of numeric cell degradation values (CDVs), wherein the multiple battery state functions are calibrated relationships of the cell sense data to predetermined battery fault conditions; and
      automatically adapt a usage level of the battery pack during operation of the battery pack based on the numeric CDVs; and
    wherein the controller is configured to automatically adapt the usage level of the battery pack includes modifying calibrated charging limits, charging rates, and/or thermal limits of the battery pack during a charging cycle of the battery pack using the offboard charging station and/or an onboard solar panel.

12. The electric powertrain system of claim 11, wherein the predetermined battery fault conditions include an intermittent or sustained electrical short condition within the respective battery cell, and wherein the multiple battery state functions include an electrical short function indicative of the intermittent or sustained electrical short condition.

13. The electric powertrain system of claim 11, wherein the predetermined battery fault conditions include an active material plating condition and/or an electrolyte leakage condition of the respective battery cell, and wherein the multiple battery state functions include a plating function indicative of a level of the active material plating condition and/or an electrolyte leakage function indicative of the electrolyte leakage condition, respectively.

14. The electric powertrain system of claim 11, wherein the predetermined battery fault conditions include a diminished energy holding capacity of the respective battery cell, and wherein the multiple battery state functions include a capacity function indicative of the diminished energy holding capacity.

15. The electric powertrain system of claim 11, wherein the controller is configured to process the cell sense data and at least one additional powertrain control factor through an arbitration logic block, and to automatically adapt the usage level of the battery pack in part by assigning a relative weight to each respective one of the multiple battery state functions and the additional powertrain control factor via the arbitration logic block.

16. The electric powertrain system of claim 15, wherein the at least one additional powertrain control factor includes a life modeling limit and/or an energy/regeneration optimization limit.

17. The electric powertrain system of claim 11, wherein the rotary electric machine is an electric propulsion motor for a motor vehicle, and wherein the controller is configured to process an additional powertrain control factor that includes a navigation/route planning-based limit of the motor vehicle in which a full charge is deferred until a preferred charging location is reached.

18. The electric powertrain system of claim 11, wherein the rotary electric machine is an electric propulsion motor for a motor vehicle, and wherein the controller is configured to automatically identify Charge Termination Limit (CTL) modification requestors, and to thereafter arbitrate therebetween the CTL modification requestors.

19. A method for adapting a usage level of a battery pack having a plurality of battery cells, the method comprising:
measuring cell sense data for each respective one of the battery cells using a cell sense circuit, the cell sense data including a cell voltage, a cell current, and a cell temperature;
processing the cell sense data, for each respective battery cell of the plurality of battery cells, through multiple battery state functions of a controller to thereby generate a plurality of numeric cell degradation values (CDVs), wherein the multiple battery state functions are calibrated relationships of the cell sense data to predetermined battery fault conditions;
automatically adapting the usage level of the battery pack during operation of the battery pack, via the controller, based on the numeric CDVs; and
wherein automatically adapting the usage level of the battery pack includes modifying calibrated charging limits, charging rates, and/or thermal limits of the battery pack during a charging operation of the battery pack.

20. The method of claim 19, wherein automatically adapting the usage level of the battery pack includes modifying calibrated discharging limits and/or thermal limits of the battery pack during a discharging operation of the battery pack.

\* \* \* \* \*